(12) United States Patent
Schmitz

(10) Patent No.: US 9,254,794 B2
(45) Date of Patent: Feb. 9, 2016

(54) PLAY-FREE CONNECTION DEVICE

(71) Applicant: Johnson Controls GmbH, Burscheid (DE)

(72) Inventor: Andreas Schmitz, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 14/382,384

(22) PCT Filed: Mar. 1, 2013

(86) PCT No.: PCT/EP2013/054153
§ 371 (c)(1),
(2) Date: Sep. 2, 2014

(87) PCT Pub. No.: WO2013/127992
PCT Pub. Date: Sep. 6, 2013

(65) Prior Publication Data
US 2015/0104248 A1  Apr. 16, 2015

(30) Foreign Application Priority Data

Mar. 2, 2012  (DE) .......... 10 2012 004 026

(51) Int. Cl.
*B60J 7/00* (2006.01)
*B60R 13/02* (2006.01)
*F16G 11/08* (2006.01)
*F16G 11/10* (2006.01)
*F16B 9/02* (2006.01)
*F16C 1/10* (2006.01)
*F16B 21/06* (2006.01)

(52) U.S. Cl.
CPC ............ *B60R 13/0206* (2013.01); *F16G 11/08* (2013.01); *F16G 11/10* (2013.01); *F16G 11/103* (2013.01); *F16B 9/023* (2013.01); *F16B 21/065* (2013.01); *F16C 1/101* (2013.01); *Y10T 403/7039* (2015.01)

(58) Field of Classification Search
CPC .. B29C 66/71; A01D 34/902; B29K 2027/06; B29K 2067/003; E03C 1/04; H01R 12/716; E05D 11/0081; E05Y 2800/10; E05Y 2900/31; F25C 1/00
USPC ...................... 296/190.08; 439/660
See application file for complete search history.

(56) References Cited

U.S. PATENT DOCUMENTS

| | | | | |
|---|---|---|---|---|
| 2,688,300 | A * | 9/1954 | Works | 116/70 |
| 3,565,116 | A * | 2/1971 | Gabin | 285/45 |
| 4,524,800 | A * | 6/1985 | Holland | 137/516.27 |
| 5,181,866 | A * | 1/1993 | Jerome et al. | 439/850 |
| 5,193,961 | A * | 3/1993 | Hoyle et al. | 411/553 |
| 5,718,549 | A * | 2/1998 | Noda et al. | 411/553 |

(Continued)

FOREIGN PATENT DOCUMENTS

| | | |
|---|---|---|
| DE | 10 2007 041 613 B4 | 2/2009 |
| EP | 0 913 591 A1 | 5/1999 |

(Continued)

*Primary Examiner* — Kiran B Patel
(74) *Attorney, Agent, or Firm* — McGlew and Tuttle, P.C.

(57) ABSTRACT

A connection device (1), of a vehicle interior equipment part, has a receiving part (2) which receives, preferably reversibly, an end fitting (4). The end fitting (4) is provided on a structural part with a stop face (5). The stop face (5), in the connected state, bears against a bearing face (2.1) of the receiving part (2).

6 Claims, 1 Drawing Sheet

(56) References Cited

U.S. PATENT DOCUMENTS

2011/0088241 A1* 4/2011 Eglinger et al. ............. 29/513
2011/0140486 A1* 6/2011 Schmitz ................. 297/216.12

FOREIGN PATENT DOCUMENTS

| WO | 80/02313 A1 | 10/1980 |
| WO | 2008/151 805 A2 | 12/2008 |

* cited by examiner

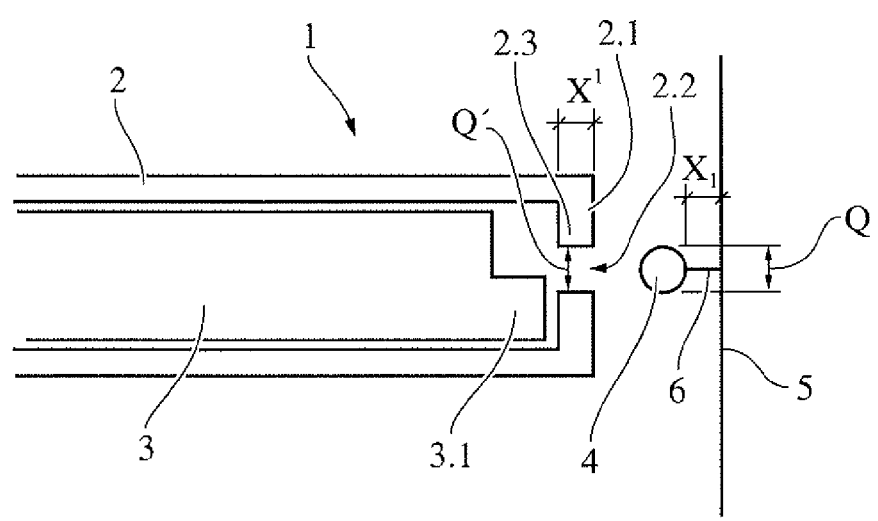

PLAY-FREE CONNECTION DEVICE

CROSS REFERENCE TO RELATED APPLICATIONS

This application is a United States National Phase Application of International Application PCT/EP2013/054153 filed Mar. 1, 2013 and claims the benefit of priority under 35 U.S.C. §119 of German Patent Application DE 10 2012 004 026.1 filed Mar. 2, 2012, the entire contents of which are incorporated herein by reference.

FIELD OF THE INVENTION

The present invention relates to a connection device (a connection means) of a vehicle interior trim part having a receptacle part which receives an end fitting, preferably in a reversible manner.

BACKGROUND OF THE INVENTION

A connection device (a connection means) of this type is known from the prior art, for example DE 10 2007 041 613 B4.

SUMMARY OF THE INVENTION

It is an object of the present invention to further improve connection devices of this type.

The object is achieved by way of a connection device of a vehicle interior trim part having a receptacle part which receives an end fitting, preferably in a reversible manner, the end fitting being provided on a component with a stop face which bears against a bearing face of the receptacle part in the connected state.

The present invention relates to a connection device of a vehicle interior trim part having a receptacle part which receives an end fitting, preferably in a reversible manner. The end fitting can be any desired component which can be introduced into a receptacle part. The end fitting can be deformed at least partially, in particular reversibly, during the introduction into the receptacle part. For example, the end fitting is of spherical or cylindrical design. Such a spherical fitting is provided on a component of the vehicle interior trim, which component has a stop face which bears against a bearing face of the receptacle part in the connected state, that is to say when the end fitting is situated within the receptacle part. As a result, the connection device according to the invention is play-free. The maximum penetration depth of the fitting into the receptacle part preferably corresponds to a spacing between the end fitting and the stop face.

Furthermore, the fitting is preferably fastened to the component by way of a connection device. The connection device can be, for example, a flexible connection device, for example a cable, in particular a steel cable, for example the core of a Bowden cable. However, the connection device can also be rigid. The end fitting is preferably connected to said cable in a non-positive, positively locking and/or material-to-material manner. The free length of the connection device, that is to say the length between the fitting and the stop face, preferably corresponds to the penetration depth of the fitting into the receptacle part. As a result, the connection device according to the invention is play-free.

Furthermore, the receptacle part preferably has an opening, the size of which can be changed reversibly by the end fitting. During the introduction of the end fitting into the receptacle part, said opening is preferably enlarged and particularly preferably snaps at least partially back into its original size as soon as the end fitting is situated within the receptacle part. A means, for example a lug, preferably protrudes into the opening, by way of which lug the cross section of the opening can be changed. The means is preferably provided on a slide which is provided longitudinally displaceably in the receptacle part. The slide is particularly preferably prestressed elastically in the direction of the opening.

The connection device is suitable, in particular, for connecting two segments of a force transmission means, in particular a tensile force transmission means, for example a Bowden cable. The transmission means is preferably the core of a Bowden cable.

The connection device preferably has a release means for releasing the connection between the receptacle part and the end fitting.

In the following text, the invention will be explained with reference to the single FIGURE. These explanations are merely by way of example and do not restrict the general concept of the invention. The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWING

FIG. 1 is a schematic view showing the connection device according to the invention.

DESCRIPTION OF THE PREFERRED EMBODIMENTS

Referring to the drawings in particular, FIG. 1 shows the connection device 1 according to the invention which has a receptacle part 2 with an opening 2.2. Furthermore, the connection device according to the invention has a component with a stop face 5, on which an end fitting 4 is provided by means of a fastening means 6. In order to connect the component to the receptacle part 2, the end fitting 4 is introduced through the opening 2.2 into the receptacle part. In this case the lug 3.1, which is provided on a slide 3, is displaced to the left and releases the cross section Q' of the opening 2.2 completely, with the result that the fitting 4 can be introduced through the opening into the receptacle part. As soon as the fitting 4 is situated completely in the receptacle part, the slide 3, which is prestressed, for example, by way of a spring in the direction of the opening 2.2, snaps back automatically and therefore reduces the cross section Q' of the opening 2.2 in such a way that the cross section Q of the fitting 4 no longer fits through the reduced opening 2.2 and the end fitting 4 is hooked behind the projection 2.3 of the receptacle part 2. According to the invention, the thickness X1 of the projection 2.3 and the length X1 of the fastening means 6 are then provided to be at least substantially identical, with the result that the stop face 5 of the component bears against the bearing face 2.1 of the receptacle part 2 as soon as the fitting 4 is situated behind the projection 2.3. As a result, the connection device according to the invention does not have any play, with the result that forces, in particular tensile forces, can be transmitted without play and no rattling noises occur.

While a specific embodiment of the invention has been shown and described in detail to illustrate the application of the principles of the invention, it will be understood that the invention may be embodied otherwise without departing from such principles.

The invention claimed is:

1. A connection device of a vehicle interior trim part, the connection device comprising:
    an end fitting provided on a component with a stop face; and
    a receptacle part which receives the end fitting in a reversible manner, wherein the stop face bears against a bearing face of the receptacle part in the connected state, the receptacle part having an opening, the size of which can be changed reversibly by the end fitting, wherein a cross section changing means protrudes into the opening, by way of which the cross section changing means the cross section of said opening can be changed, the cross section changing means being provided on a slide which is provided displaceably in the receptacle part, wherein the slide is prestressed in the direction of the opening.

2. The connection device as claimed in claim 1, wherein the maximum penetration depth of the end fitting into the receptacle part corresponds to a spacing between the end fitting and the stop face.

3. The connection device as claimed in claim 1, further comprising a fastening means, wherein the fitting is fastened to the component by way of the fastening means.

4. The connection device as claimed in claim 3, wherein a free length of the connection means corresponds to a penetration depth of the end fitting into the receptacle part.

5. The connection device as claimed in claim 1, wherein the connection device connects two segments of a force transmission means.

6. The connection device as claimed in claim 1, wherein the connection device has a means for releasing the connection between the receptacle part and the end fitting.

* * * * *